W. FREDERICK.
Quilting Frame.

No. 56,202.                                                                 Patented July 10, 1866.

Witnesses:

Inventor:
Wm. Frederick
Per Murry & Co.
Attys.

UNITED STATES PATENT OFFICE.

WILLIAM FREDERICK, OF ASHLAND, PENNSYLVANIA.

IMPROVEMENT IN QUILTING-FRAMES.

Specification forming part of Letters Patent No. 56,202, dated July 10, 1866.

*To all whom it may concern:*

Be it known that I, WILLIAM FREDERICK, of Ashland, in the county of Schuylkill and State of Pennsylvania, have invented a new and useful Improvement in Quilting-Frames; and I do hereby declare that the following is a full, clear, and exact description thereof, which will enable others skilled in the art to make and use the same, reference being had to the accompanying drawings, forming part of this specification, in which—

Figure 1:
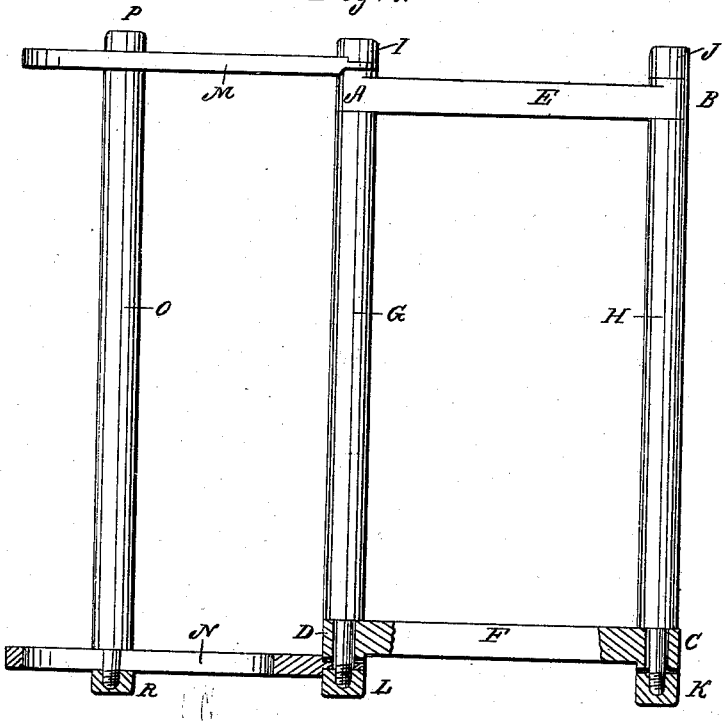
Figure 2:
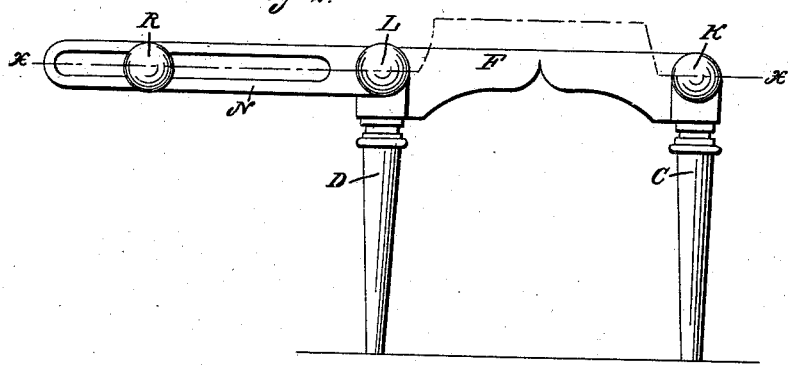

Figure 1 is a top or plan view of my improved quilting-frame, partly in section, through the line $x\ x$, Fig. 2. Fig. 2 is an end view of the same.

Similar letters of reference indicate like parts.

My invention has for its object to furnish an improved quilting-frame, so constructed and arranged that the quilt may be extended to its full size upon the frame, so that the design to be formed upon the quilt by the quilting may be marked out, and the frame then so adjusted that the quilting may be done at both sides of the frame, and when one strip has been finished that strip may be rolled up and another portion unrolled; and it consists, first, of a quilting-frame formed by combining a set of rollers and nuts with each other and with the supports or legs of the frame; and, second, in the combination, with the main part of the frame, of a removable and adjustable part, constructed and arranged as hereinafter more fully described.

The quilting-frame is supported upon four feet, A B C D. The two feet at each end of the machine are connected by cross-bars E and F. The cross-bars may be solidly connected to the feet, as shown in the drawings, or they may be made with tenons passing through the upper parts of the feet and held in place by the axles of the rollers G and H passing through them. This latter construction I prefer. The rollers G and H form the sides of the frame. Their axles pass through the upper ends of the feet, as shown in Fig. 1, and have screw-threads cut upon them, upon which are screwed thumb-nuts I J K L. These screws and nuts not only hold the frame together, but when loosened allow the rollers to be revolved for shifting the quilt, and when again tightened clamp the rollers, and consequently the quilt, in any desired position.

The axles of the roller G are made a little longer than those of the roller H, so that they may be long enough to receive upon them the ends of the arms M and N. The ends of these arms are formed with shoulders, as shown in Fig. 1, which rest against the upper part of the feet A D and hold the detached part of the frame in a horizontal position.

The arms M and N are slotted longitudinally, as shown in Figs. 1 and 2, and in these slots revolve the axles of the roller O. Upon the ends of these axles are cut screw-threads for the reception of the nuts P R, by means of which the roller O may be secured in any desired position.

In using the frame, one edge of the quilt is secured to the roller H in the ordinary manner. The roller O is then brought into the proper position and the other edge of the quilt attached to it. The quilt is thus spread out to its full size upon the frame, and the designs to be followed in quilting can be conveniently marked upon it. The nuts P R J K are then loosened and the quilt wound upon the roller H, the roller O being drawn at the same time along the slots in the arms M and N. When the roller O reaches the ends of the slots the edge of the quilt is removed from the roller O and attached to the roller G. The roller O and arms M and N are then detached from the frame.

When the part of the quilt between the rollers G and H has been quilted it may be rolled upon the roller G and another portion of the quilt exposed, and so on until the quilt has been completed. The frame may then be taken apart and stored away.

What I claim as new, and desire to secure by Letters Patent, is—

1. An improved quilting-frame formed by combining and arranging a set of rollers, G H, and nuts I J K L with each other and with the legs or supports A B C D of the frame, substantially as described, and for the purpose set forth.

2. The combination, with the main part of the frame, of the removable and adjustable part M N O, constructed and arranged substantially as herein described, and for the purpose set forth.

WILLIAM FREDERICK.

Witnesses:
ALEX. F. ROBERTS,
JAMES T. GRAHAM.